US008538934B2

(12) United States Patent
Hudis et al.

(10) Patent No.: US 8,538,934 B2
(45) Date of Patent: Sep. 17, 2013

(54) CONTEXTUAL GRAVITATION OF DATASETS AND DATA SERVICES

(75) Inventors: Efim Hudis, Bellevue, WA (US); Christopher Kelly Eakins, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 13/284,140

(22) Filed: Oct. 28, 2011

(65) Prior Publication Data
US 2013/0110792 A1 May 2, 2013

(51) Int. Cl.
*G06F 7/00* (2006.01)
*G06F 17/00* (2006.01)

(52) U.S. Cl.
USPC ............................. 707/692; 707/802; 715/216

(58) Field of Classification Search
None
See application file for complete search history.

(56) References Cited

U.S. PATENT DOCUMENTS

| | | | | |
|---|---|---|---|---|
| 6,032,153 | A * | 2/2000 | Sadiq et al. ............................ | 1/1 |
| 6,460,059 | B1 * | 10/2002 | Wisniewski ................... | 715/212 |
| 6,873,990 | B2 | 3/2005 | Oblinger | |
| 7,698,683 | B1 * | 4/2010 | Miller et al. ................... | 717/104 |
| 7,895,223 | B2 | 2/2011 | Toebes | |
| 2004/0015474 | A1 * | 1/2004 | Anonsen ............................ | 707/1 |
| 2004/0131076 | A1 * | 7/2004 | Smith ............................. | 370/432 |
| 2004/0181533 | A1 * | 9/2004 | Santosuosso ................... | 707/10 |
| 2005/0131919 | A1 * | 6/2005 | Brookler et al. ................ | 707/100 |
| 2005/0154714 | A1 * | 7/2005 | Yu et al. ............................ | 707/3 |
| 2005/0262070 | A1 * | 11/2005 | Christensen et al. ............. | 707/4 |
| 2006/0010367 | A1 * | 1/2006 | Sattler et al. ................... | 715/503 |
| 2006/0069696 | A1 * | 3/2006 | Becker et al. ................. | 707/102 |
| 2006/0212469 | A1 * | 9/2006 | Babanov et al. ............... | 707/102 |
| 2006/0242104 | A1 * | 10/2006 | Ellis et al. .......................... | 707/1 |
| 2007/0038930 | A1 * | 2/2007 | Derrick et al. ................ | 715/523 |
| 2007/0043693 | A1 * | 2/2007 | Krieg ................................ | 707/1 |

(Continued)

FOREIGN PATENT DOCUMENTS

EP 1367503 A1 * 12/2003
EP 1387293 A1 * 2/2004

(Continued)

OTHER PUBLICATIONS

Cafarella, et al., "WebTables: Exploring the Power of Tables on the Web", Retrieved at <<http://yz.mit.edu/papers/webtables-vldb08.pdf>>, VLDB Endowment, vol. 1, Issue 1, Aug. 2008, pp. 538-549.

(Continued)

*Primary Examiner* — Augustine K Obisesan
(74) *Attorney, Agent, or Firm* — Ogilvie Law Firm (57) ABSTRACT

Through proactive structured dataset management, suggestions are made for dataset enrichment, cleansing, and other enhancements. Users need not go looking for potentially helpful datasets online or in an enterprise filesystem, because relevant datasets and services will be automatically suggested, based on a samplex cast from the user's dataset. Enrichment may add typed attributes, rows, and/or cell values from a matching dataset, may cleanse data, and may add another dataset which has data about the same entity as the original dataset. Proactive dataset and service matching occurs inside a security perimeter to protect confidentiality. Confidence in suggested modifications may be shown by color differences. Modifications may be previewed, and kept or reverted after acceptance. Suggestions are made in from-example or from-scratch scenarios. Samplex, preview, modification, and other modules reside in an architecture that supports a variety of data sources and dataset service providers, in an auction or other market.

20 Claims, 3 Drawing Sheets

(56) References Cited

U.S. PATENT DOCUMENTS

| | | | |
|---|---|---|---|
| 2007/0073674 A1* | 3/2007 | McVeigh et al. | 707/4 |
| 2007/0078873 A1* | 4/2007 | Avinash et al. | 707/101 |
| 2007/0079282 A1* | 4/2007 | Nachnani et al. | 717/106 |
| 2007/0100862 A1* | 5/2007 | Reddy et al. | 707/102 |
| 2007/0136698 A1* | 6/2007 | Trujillo et al. | 716/1 |
| 2007/0156519 A1 | 7/2007 | Agassi et al. | |
| 2007/0226168 A1* | 9/2007 | Mukundan et al. | 707/1 |
| 2010/0036872 A1* | 2/2010 | Hiraiwa et al. | 707/103 R |
| 2010/0138388 A1* | 6/2010 | Wakeling et al. | 707/634 |
| 2011/0125744 A1 | 5/2011 | Immonen et al. | |
| 2011/0295835 A1* | 12/2011 | Kenedy et al. | 707/713 |

FOREIGN PATENT DOCUMENTS

| | | |
|---|---|---|
| WO | WO 03014977 A1 * | 2/2003 |
| WO | WO 2005015378 A2 * | 2/2005 |
| WO | WO 2005050481 A1 * | 6/2005 |
| WO | WO 2006110485 A2 * | 10/2006 |

OTHER PUBLICATIONS

Baumgartner, et al., "Web Data Extraction System", Retrieved at <<http://www.cs.washington.edu/homes/gatter/download/Web_Data_Extraction_System.pdf>>, Encyclopedia of Database Systems, 2009, pp. 1-9.

He, et al., "BIwTL: A Business Information Warehouse Toolkit and Language for Warehousing Simplification and Automation", Retrieved at <<http://www.almaden.ibm.com/people/binhe/pubs/getl-sigmod07.pdf>>, Proceedings of the ACM SIGMOD international conference on Management of data, Jun. 11-14, 2007, pp. 1041-1052.

* cited by examiner

CONTEXTUAL GRAVITATION OF DATASETS AND DATA SERVICES

BACKGROUND

Data analysts and other people work with a wide variety of digital data, which is organized in various ways, and to various extents. Some data values are solitary, in the sense that they do not belong (or at least are not treated as belonging) to a set of related data values. But many data values are part of a collection of data values. Some collections have little or no internal structure, but other collections are organized to facilitate operations such as retrieval of particular values, comparison of values, and computational summaries based on multiple values of the collection.

An organized collection of data values is referred to herein as a "dataset" (a.k.a. "data set", "structured data", "structured dataset"). Because the data in a dataset is structured, one can say more about it than a mere recital of its value and its membership in the data set. In a spreadsheet dataset, for example, a given piece of data not only has a value and membership in the set of spreadsheet values, it also has an associated row and column, which may in turn have characteristics such as names and data types. For present purposes, some familiar examples of "structured data" include relational database records, spreadsheets, tables, and arrays. By contrast, the text in an email or a word processing document is generally unstructured data or lacks a standard internal structure. Structured data may be placed in a dataset manually by typing, but computational capability can provide a range of other possibilities for adding values to a data set, changing values in a data set, and otherwise managing datasets.

SUMMARY

Finding possible enhancements and corrections of structured data by web browsing or by database searches can be challenging, and can distract users from the analysis of their structured data. However, some embodiments described herein provide a proactive structured dataset management that gives data analysts and other users a "try-it-on" experience in which enhancements and other data services are proactively suggested. Datasets and/or data services which are relevant to the user's current context "gravitate" to that context. Suggestions of relevant datasets and/or data services are made based on factors such as: computed similarities and/or associations between a dataset that is currently in a user's context and other non-local datasets, which may be in the user's enterprise or elsewhere; identification of a dataset attributes as belonging to a desired target of a data service. Users do not need to go looking for potentially helpful datasets online or in an enterprise filesystem, for example, but are able to remain focused instead on a particular dataset, secure in the knowledge that suggestions of relevant non-local information will be automatically provided to them.

In some embodiments, structured dataset management includes obtaining a structured dataset in a user work context such as an instance of a spreadsheet, report generator, or web browser. The structured dataset has at least one typed attribute, with each typed attribute having a column name and an associated data type. Management casts the structured dataset into a samplex having at least one typed attribute in common with the structured dataset. The samplex is computationally derived from the structured dataset. In addition to having at least one typed attribute in common with the structured dataset, the samplex may also share an attribute category and/or a cell value. However, the samplex generally avoids compromising the confidentiality of values in the structured dataset cells. After identifying at least one matching dataset or service based at least partially on the samplex or other mechanisms, dataset management gravitates the matching dataset or data service to the user's context. A gravitated dataset may be simply viewed and then discarded, or it may be used to make proactive or user-confirmed modification(s) of the structured dataset which are based at least partially on the matching dataset. The matching dataset is also structured, but "structured dataset" herein generally refers to the user's original structured dataset. A gravitated data service maybe applied to the user's structured dataset, and the results may be viewed, discarded, kept temporarily, kept permanently, merged into other datasets, and/or otherwise utilized.

For example, gravitation and other aspects of dataset management may enrich a structured dataset by adding at least one typed attribute of the matching dataset. In some but not all cases, selection of the added attribute is based at least partially on attribute frequent itemsets information, e.g., schema membership and contextual set frequency statistics information gathered from a relevant sampling of external and local datasets. Attribute frequent itemsets information indicates which typed attribute characteristics (names, data types) tend to appear together in some universe of relevant datasets. The universe of relevant sets may be, for example, all datasets created by someone in the user's department, all datasets used in the past N months by the user's enterprise, all datasets having a specified column name, all datasets having been marked up with additional metadata indicating they possess certain desirable qualities such as quality, timeliness, credibility, or popularity, or another dataset universe of interest.

As another example, dataset management may instead or also enrich the user's structured dataset by adding at least one row of the matching dataset, and/or by adding at least one cell value of the matching dataset to a row of the structured dataset. Modification may also or instead change at least one cell value of the structured dataset to match a cell value of the matching dataset (i.e., perform data cleansing). Cleansing may include matching a dataset to a data service through gravitation. In some embodiments, modification may add the matching dataset to the user work context as another dataset, rather than blending the matching dataset with the original structured dataset on a per-cell, per-row, and/or per-column basis. In some cases, the matching dataset shares an entity with the structured dataset, e.g., both datasets may hold information about a given enterprise, person, or other entity. An entity may be shared in terms of subject matter even though the datasets do not share a typed attribute.

In some embodiments, a matching dataset identification occurs computationally inside a client security perimeter, with the matching dataset being a dataset which was brought inside the client perimeter. In some cases, a matching dataset identification occurs computationally inside a client security perimeter, but instead of bringing the matching dataset inside the client perimeter, a dataset samplex for the matching dataset was brought inside the perimeter. In some cases, a matching dataset identification occurs computationally outside a client security perimeter, by using the structured dataset samplex outside the perimeter without bringing the structured dataset itself outside the perimeter. To protect confidentiality of the structured dataset's cell values, however, the structured dataset itself is not brought outside the client perimeter. In addition to, or instead of, such use in matching datasets, the samplex may be used to match services with the structured dataset. For example, some embodiments match a samplex to a data cleansing service. In some cases, bringing an entire matching dataset inside a security perimeter is too burdensome or not practical, e.g., if there are many matching datasets and/or if matching datasets are large. In some cases, a service filter containing algorithmic criteria or code to run is brought inside the user security perimeter to indicate back to a candidate service how good the match is between the service's desired target and the user's contextual dataset, without exposing the user's data outside the security perimeter.

In some embodiments, an interface capability is exercised computationally by displaying a cell value of the structured dataset in a first color and at the same time displaying a suggested modification of another cell value in a second different color. In some, colors are used to indicate that there are suggested modification(s), as opposed to showing the suggestion(s) with different colors. In some embodiments, an interface capability changes a cell value from a first value to a second value, displays the second value, and then reverts to the first value without typing in the first value after the second value has been displayed. In some, an interface capability displays a modification preview, namely, an image of a result of a possible modification that has not yet been accepted by a user. Some embodiments include two, or all three, of these interface capabilities, and may include other interface capabilities discussed below.

Sometimes structured dataset management occurs within a from-example scenario. That is, the structured dataset already includes at least one row with corresponding typed attributes and with one or more cell values populating the row(s). In a from-example scenario, suggestions and/or suggested modifications are made based on the existing dataset—the existing dataset is the example from which guidance is obtained to make modification suggestions. For example, dataset management may proactively suggest an additional attribute for the structured dataset, an additional row for the structured dataset, a change in at least one of the cell value(s), an additional cell value, and/or a cell value deletion.

Sometimes structured dataset management occurs within a from-scratch scenario, in the sense that although the structured dataset includes at least one typed attribute, a user is creating a dataset schema from scratch. For instance, the user's dataset may contain (as yet) no cell values. In this scenario, dataset management may computationally suggest within the user work context additional attributes for the structured dataset, based at least partially on the attribute(s) the user has entered and on attribute frequent itemsets information.

Although much of the foregoing is discussed from a structured dataset management provider's perspective, it will be appreciated that many aspects of dataset management can also be viewed from the perspective of a data analyst or other user. For example, in some cases a data analyst supplies within a user work context a structured dataset as discussed, e.g., a dataset that includes at least one row with corresponding typed attributes and with one or more cell values populating the row(s). The structured dataset may be supplied, for instance, by opening it in a spreadsheet application within an embodiment. The embodiment automatically tracks (or is notified of) spreadsheet and/or other application activity and proceeds automatically to create a samplex, identify matching datasets, make suggestions, and so forth, when a dataset is opened.

In some cases, the data analyst modifies the structured dataset in the user work context by operating a computational system in a manner that performs one or more of the modifications discussed above. Modifications may be based at least partially on a matching dataset, and may be performed without first explicitly identifying the matching dataset to the computational system in the user work context. In particular, if the user is employed by an enterprise then a modification may enrich the structured dataset by adding at least one typed attribute based on attribute frequent itemsets information of the enterprise.

In some embodiments, the data analyst or other user receives an automatic structured dataset modification suggestion after supplying the structured database and accepts the suggestion. Then the suggested modification is computationally implemented, e.g., by adding rows, changing cell values, and so on.

In some embodiments, the data analyst or other user views an interface capability. For example, the user may view a cell value of the structured dataset in a first color and at the same time view a suggested modification of another cell value in a second different color. The user may change a cell value from a first value to a second value, view the second value, and then revert to the first value without typing in the first value after the second value has been viewed. The user may view a modification preview, namely, an image of a result of a modification suggestion that has not yet been accepted by the user.

In some embodiments, the data analyst or other user makes selections and/or confirms prior selections. For example, in some cases the user selects a client security perimeter to limit distribution of the structured dataset, and in some the user confirms a prior human or automated selection of a client perimeter to limit distribution of the structured dataset. In some cases the user selects a data cleansing service to suggest changes to cell values of the structured dataset, and in some the user confirms a prior human or automated selection of a data cleansing service to suggest changes to cell values of the structured dataset. In some cases the user selects a data enriching service to suggest enrichments of the structured dataset, and in some the user confirms a prior human or automated selection of a data enriching service to suggest enrichments of the structured dataset. In some cases the user selects a shared-entity-datasets service to suggest datasets which share an entity with the structured dataset, and in some the user confirms a prior human or automated selection of a shared-entity-datasets service to suggest datasets which share an entity with the structured dataset.

From an architectural perspective, some embodiments for managing structured datasets include a local logical processor, a local memory in operable communication with the local logical processor, and a structured dataset residing in the local memory. The structured dataset has at least one typed attribute, and each typed attribute has a column name and an associated data type. In some embodiments, a structured dataset samplex module resides in the local memory and has instructions which upon execution by the local logical processor will automatically cast the structured dataset into a samplex having at least one typed attribute in common with the structured dataset. In some, the samplex of the structured dataset resides in the local memory. In some, an indication residing in the local memory indicates whether a candidate dataset, which does not necessarily reside in the local memory, is a matching dataset of the structured dataset, based on the samplex cast from the user's structured dataset.

In some embodiments, the local memory is located entirely within a secure client perimeter. In some cases, at least one of the following also resides in memory, although not necessarily local memory, that is also within the secure client perimeter: the candidate dataset, a samplex of the candidate dataset.

Some embodiments include a structured dataset modification module residing in the memory and having instructions which upon execution by the processor will automatically locate a matching dataset based on the samplex and perform one or more of the modifications discussed above, based on the matching dataset. Some include a structured dataset modification preview module residing in the memory and having instructions which upon execution by the processor will automatically provide a preview of a modification to the matching dataset.

Some embodiments include a service filter which contains instructions that upon execution by a processor will identify a service which is partially or fully compatible with the samplex, e.g., in terms of data types. The service will provide one or more structured dataset management services, such as data cleansing (correcting values), data de-duplication, dataset matching, dataset value extension, and dataset schema extension.

Some embodiments include instructions residing in the local memory which upon execution by the local processor will perform at least one of the following interface capability exercises: display through color markup a high degree of confidence in a suggested correction of the structured dataset; provide a modification preview feature controlled by hovering a cursor over the structured dataset; provide a context menu which controls bulk modification of multiple cells of the structured dataset. Some embodiments provide more than one of these interface capabilities, and some provide other interface capabilities discussed above. A given embodiment may gravitate data to the user for one or more purposes, e.g., as part of modifying user data, adding data to a user spreadsheet, and/or providing external information to a user to view on a temporary basis and optionally store locally. For example, a user's context may include a worksheet that contains (among other things) company names. An embodiment's interface may display an automatic preview showing the current stock prices for companies recognized from the worksheet, to promote user insights into the meaning of data. The user may or may not want to store such information locally, but this gravitated data is automatically available for viewing regardless of whether it is persisted locally.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Although large amounts of structured data have been published on the web, or made available in the so-called "deep web" through browser-accessible search interfaces, it is often unclear how a data analyst or other information worker can find relevant data, and sometimes unclear whether relevant data even exists. Searching and/or browsing the web for structured data can be extremely difficult and inefficient, as it is often not clear what key words one should use and how to rank the datasets identified in a search.

Similar challenges exist with regard to datasets that are used primarily or solely within large corporations and other enterprises. While information workers are often willing in principle to reuse such internal datasets, in practice reuse is rare because of the high cost of finding the relevant datasets inside the enterprise network. Likewise, it has been difficult and inefficient for information workers to find data services (cleansing, de-duplication, and so on) that are well-suited for their datasets.

Some embodiments described herein provide a user experience in which the data an information worker is currently working on is used to automatically generate relevance relations to a corpus of datasets and data services. Dataset management can then suggest relevant datasets and data service to the information worker in a seamless and low-cost way.

Some embodiments generate a samplex of data to use in the external service in order to match the user's dataset with relevant matching datasets and data services. Some perform a local (to the customer's data context) match-up of candidates. Some provide a "try-up" approach to facilitate discovery of relevant datasets and services by users. In some embodiments, a data cortex serves as a context generating service, within an information ecosystem in which relevance measures are generated by partners as part of an auction environment for dataset management services.

Some embodiments pre-apply dataset services to offer more clearly defined benefits. Some automatically generate suggested structured data that may relate to a user's own structured data. Some automatically match user datasets to providers of various data services, e.g., for data cleansing, de-duplication, and various kinds of data enrichment. Some automatically suggest datasets for schema enhancements, or for data extension. Some embodiments automatically provide shared-entity datasets to help generate insights gained by pivoting and joining user data with external data. Some embodiments offer provider-specific analysis, classification and auctioning of datasets and/or data services.

Some embodiments described herein may be viewed in a broader context. For instance, concepts such as datasets, matching, data types, adding, reverting, changing, and suggesting may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving datasets, matching, data types, adding, reverting, changing, and/or suggesting are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Computationally" means a computing device (processor plus memory, at least) is being used, and excludes obtaining a result by mere human thought or mere human action alone. For example, doing arithmetic with a paper and pencil is not doing arithmetic computationally as understood herein. "Computational steps" are steps performed computationally.

"Proactively" means without a direct request from a user. Indeed, a user may not even realize that a proactive step by an embodiment was possible until a result of the step has been presented to the user.

A "user work context" is an instance of a tool for viewing (at least) structured datasets. An instance of a spreadsheet, report generator, or web browser, for example, is a user work context.

Throughout this document, use of the optional plural "(s)", "(es)", or "(ies)" means that one or more of the indicated feature is present. For example, "value(s)" means "one or more values" or equivalently "at least one value".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, adding, bringing, casting, changing, cleansing, confirming, controlling, displaying, enriching, entering, executing, exercising, extending, identifying, indicating, matching, modifying, obtaining, opening, operating, performing, providing, receiving, reverting, selecting, suggesting, supplying, viewing (or accepts accepted, adds, added, and so on) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
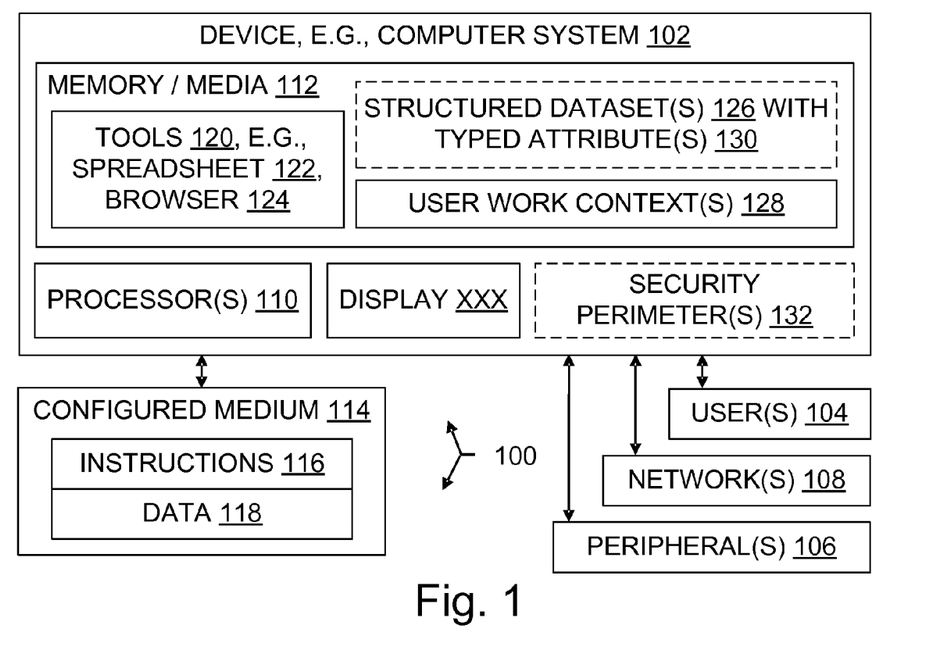
FIG. 1 is a block diagram illustrating a computer system having at least one processor, at least one memory, at least one spreadsheet or browser or other application for viewing a structured dataset, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. Data analysts, system administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media (as opposed to a propagated signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by preview, modification, and other dataset management operations as discussed herein.

Tools 120 such as a spreadsheet 122, a browser 124, and/or other tools for (at least) viewing structured datasets 126, and other aspects of a user work context 128 such as configuration parameters, credentials, and kernel software, as well as other items shown in the Figures and/or discussed in the text, may reside partially or entirely within one or more media 112, thereby configuring those media. Structured datasets 126, if present, will generally have at least one typed attribute 130. Client security perimeter(s) 132, in the form of firewalls, access controls, authentication mechanisms, and other familiar data security tools, may also be present. In addition to the processor(s) 110 and memory/media 112, an operating environment may also include other hardware, such as display(s) 134, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
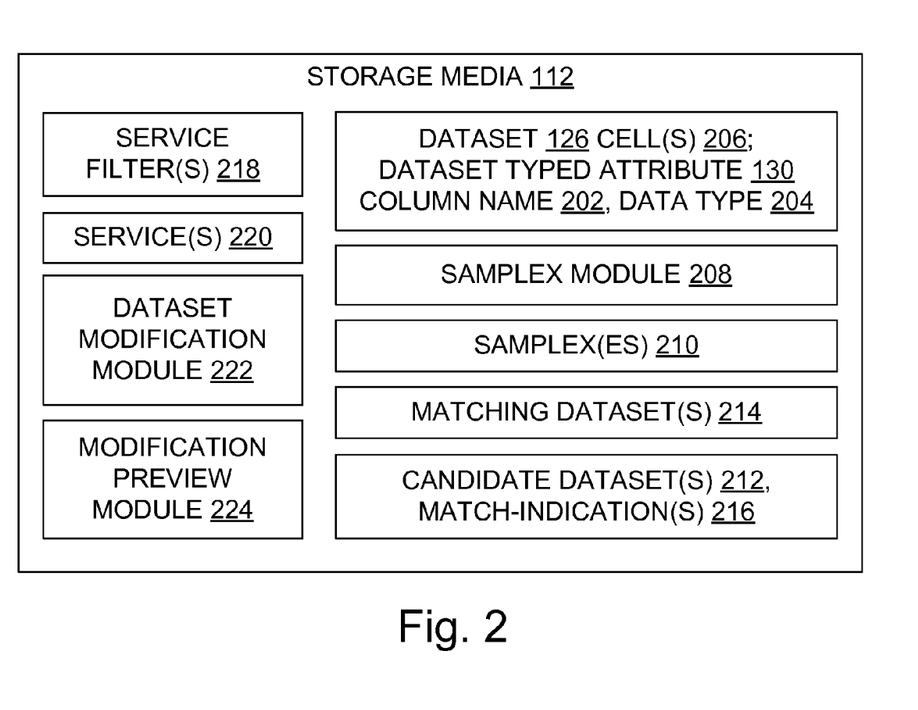
FIG. 2 is a block diagram illustrating aspects of structured dataset management in an example architecture.
Figure 3:
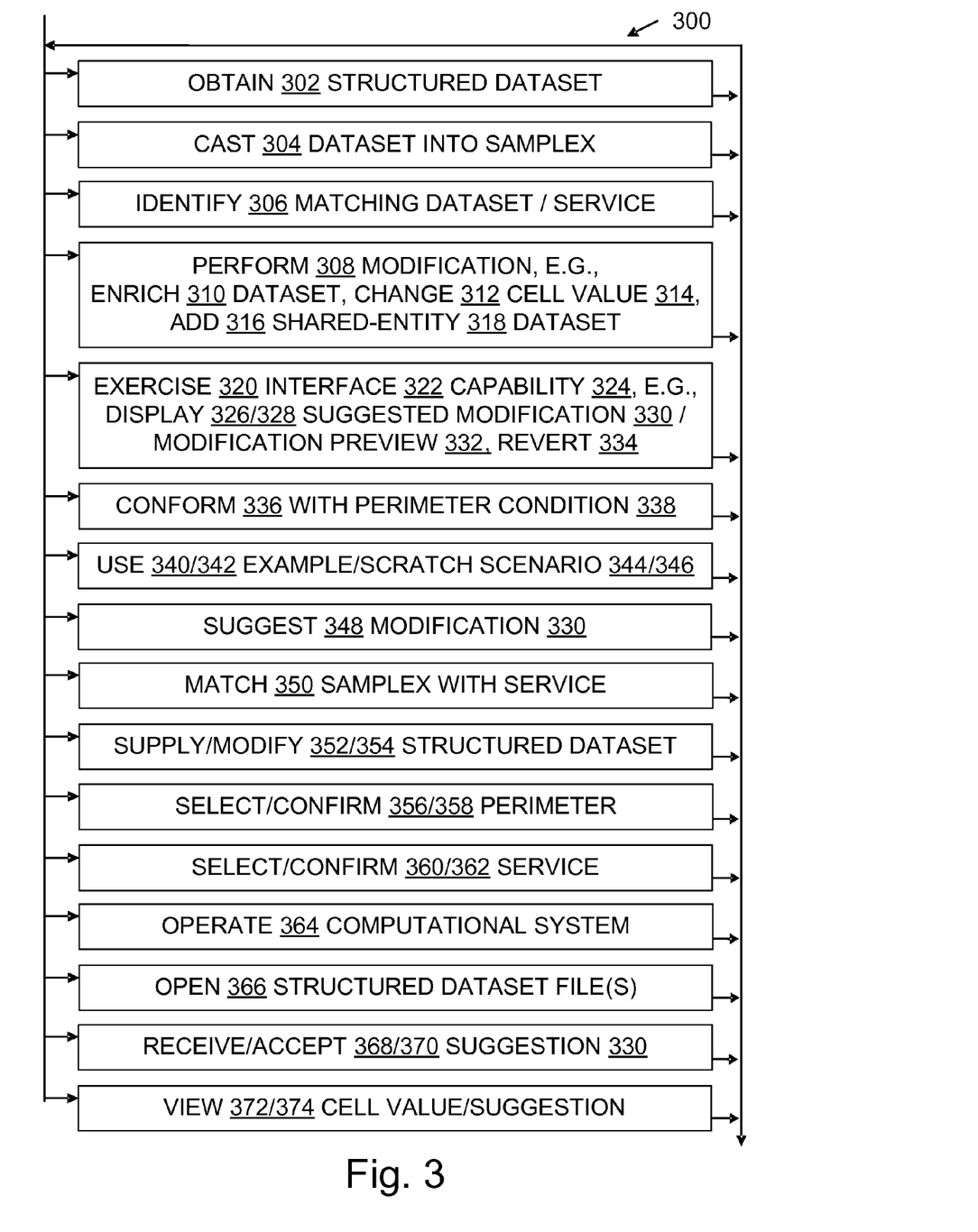
FIG. 3 is a flow chart illustrating steps of some process and configured storage medium embodiments.

FIG. 2 illustrates an architecture which is suitable for use with some embodiments; supporting reference is also made in this discussion to FIGS. 1 and 3. A structured dataset 126 has one or more typed attributes 130. Each typed attribute 130 has a name 202, such as a column name, and a data type 204, such as string, real, integer, address, zip code, dollars, euros, date, time, and so on. Although two-dimensional structured datasets with rows and columns are used herein as convenient examples, datasets may in general be N-dimensional structures, in that a given cell 206 of the dataset can have N positional coordinates, where $N >= 2$.

In some embodiments, a samplex module 208 includes logic (code with supporting hardware) that is capable of computing a samplex 210 from a given dataset 126. A "samplex" is a data structure which reflects some, but not all, of the content of a dataset from which the samplex has been cast, and otherwise conforms with the description herein as appropriate for a given embodiment.

In general, a samplex 210 may be cast from different characteristics of a dataset 126. Depending on the embodiment, a samplex 210 may be cast from one or more of the following characteristics: individual attributes (a.k.a. labels) and their data types, a schema of multiple typed attributes, attribute statistics (e.g., boundary limits, distributions, averages, and other statistical values calculated from an attribute's cell values, as opposed to individual cell values), attribute categories (e.g., "geographic", "chronological", "financial", or other general categories, as opposed to specific attributes such as address, birth date, gross income, respectively), selected cell values (e.g., randomly sampled cell values, or the cell value in row N).

In some embodiments, the correspondence between samplexes 210 and structured datasets 126 is not one-to-one. For instance, some datasets may have no corresponding samplex because one has not been generated. Also, different datasets may be cast to the same samplex if those datasets have the same pertinent characteristics, e.g., if they have the same typed attributes, regardless of whether they also have different cell values from one another. A given dataset may also be cast into different samplexes by different embodiments.

In some embodiments, a preliminary samplex may be computationally adjusted from the foregoing before being finalized for use as a samplex 210, to reflect local conditions such as history or policies. As to history, some choices of characteristics may historically have been more productive in leading to helpful service and/or dataset match suggestions, and therefore be favored for inclusion in the samplex 210. As to policies, some characteristics may be required in a samplex to conform with an enterprise policy, e.g., to be compatible with dataset service auction conventions, and some characteristics may be barred by an enterprise policy from use in a samplex, e.g., to protect trade secrets.

Some embodiments include one or more candidate datasets 212, 126, each of which may or may not subsequently be determined to also be a matching dataset 214, 126. Whether a candidate dataset 212 is also a matching dataset 214 is indicated in some embodiments by a flag, presence in a list or set of matching dataset identifiers, or by some other match-indication 216. A "matching dataset" is a dataset whose pertinent characteristics match, within a specified tolerance, the characteristics of a given structured dataset 126 of interest. Matches (and lack thereof) between datasets may be determined by comparing samplexes cast from the respective datasets.

Some embodiments include one or more service filters 218 which use samplexes 210 to filter (filter in and/or filter out) candidate services 220 as matches for a given structured dataset 126 of interest. For example, a service filter 218 may be configured to filter in services 220 that provide data cleansing of public company revenue data cell 206 values for a samplex 210 that includes any attribute 130 in the financial category, or when the samplex includes both an enterprise-name-string attribute 130 and an enterprise-reported-profits-currency attribute 130.

Some embodiments include a dataset modification module 222, which has logic for modifying a dataset 126 and/or a dataset's user work context 128. A dataset 126 may be modified by adding attributes 130, adding cells 206 to existing rows and/or as cells in newly added rows, and/or by changing (e.g., cleansing, de-duplicating) cell values. A dataset work context 128 may be modified by adding another dataset 126 which shares an entity with the original structured dataset of interest, but does not necessarily have any of the same attributes. For instance, an original dataset containing financial performance information about a public enterprise XYZ may be supplemented in the work context 128 with a dataset containing names and cross-ownership data of a group of enterprises.

Some embodiments include a dataset modification preview module 224, which has logic for temporarily showing some or all of the changes that would be made by accepting a suggested modification, e.g., by allowing the modification module 222 to enrich or change a dataset, or to add a shared-entity dataset, as just discussed. A distinction between temporary (preview) and permanent (accepted) modifications may be made in a given embodiment in various ways. In some embodiments, a preview is shown only while a cursor hovers over a specified dataset element. In some, a preview operates on a RAM buffered copy of the dataset, which is saved to non-volatile storage only after the previewed modifications are accepted by the user through some interface 322 gesture. In some embodiments, only a single modification at a time can be previewed, although that modification may impact multiple cells, e.g., it will add several new rows but will not also de-duplicate data of existing rows. However, in some embodiments, the impact of a suggested modification is seen only after the modification is made, although in some of these embodiments the modification can be undone (reverted) after it is made.

With reference to FIGS. 1 through 3, some embodiments provide a computer system 102 with a logical processor 110 and a memory medium 112 configured by circuitry, firmware, and/or software ("logic") to transform a structured dataset 126 and/or its work context 128 by proactively suggested modifications as described herein.

Some embodiments include a computational system 102 for managing structured datasets 126, including a local logical processor 110, a local memory 112 in operable communication with the local logical processor, and a "structured dataset" 126, namely, a dataset 126 of interest to the user. This dataset of interest is the dataset the user supplies, at least initially; it is the dataset the user 104 is primarily focused on. This structured dataset of interest is sometimes called the "original dataset"; although it may have been previously modified (e.g., by module 222), it is an original as opposed to being a candidate or matching dataset, because it originated with the user 104. The structured dataset resides in the local memory and has at least one typed attribute 130. In some embodiments, each typed attribute includes a column name 202 and an associated data type 204.

Some embodiments include a structured dataset samplex module 208 residing in the local memory 112. Module 208 has instructions which upon execution by the local logical processor 110 will automatically cast the structured dataset of interest into a samplex 210 having at least one typed attribute in common with that structured dataset.

Some embodiments include a samplex 210 of the structured dataset of interest. The samplex 210 also resides in the local memory 112.

Figure 4:
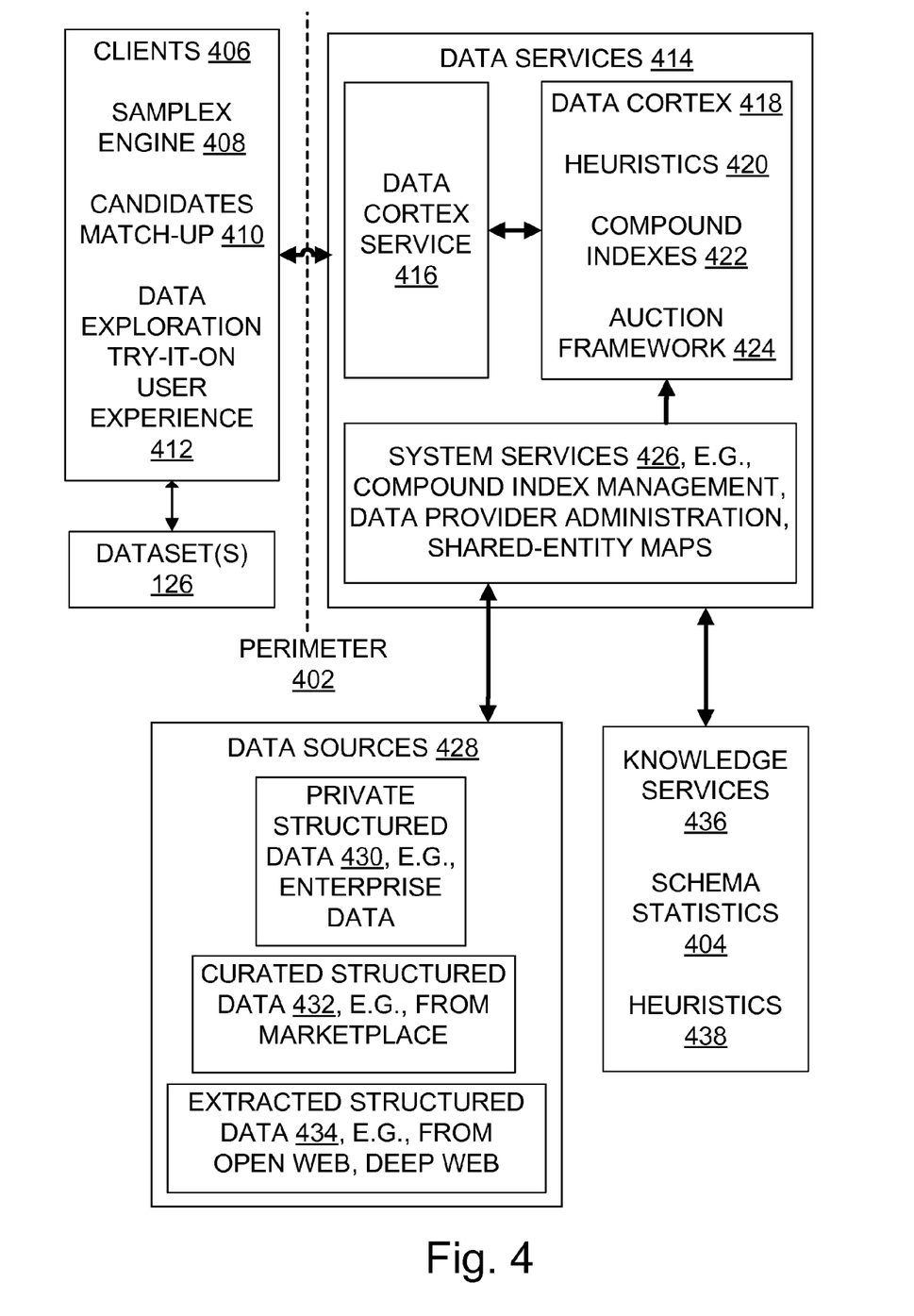
FIG. 4 is a data flow diagram illustrating aspects of structured dataset management in another example architecture.

Some embodiments include a match-indication 216, residing in the local memory 112, which indicates whether a candidate dataset 212 is a matching dataset 214 of the structured dataset 126 of interest, based on the samplex 210. The candidate dataset 212 does not necessarily reside in the local memory 112, but if it does not, then a samplex of the candidate dataset will be in local memory to allow comparison of the candidate and the original dataset, via comparison of their respective samplexes, to determine whether they match. In particular, in some embodiments the local memory 112 is located entirely within a secure client perimeter 402, and at least one of the following also resides in memory (not necessarily local memory) that is also within the secure client perimeter: the candidate dataset, a samplex of the candidate dataset.

Some embodiments include a service filter 218 which contains instructions that upon execution by a processor will identify a dataset service 220 which is compatible with the samplex of the original dataset. Match-indications 216 may be used to indicate matches between a structured dataset of interest and a dataset service 220. The service 220 may provide dataset service(s) such as data cleansing (correcting cell values), data de-duplication (removing duplicate cells, rows, columns), dataset matching (offering candidate datasets likely to match and/or matching datasets), dataset value extension (adding rows, columns; filling in blank cells), and/or dataset schema extension (adding attributes).

Some embodiments include a structured dataset modification module 222 residing in the memory and having instructions which upon execution by the processor will automatically locate a matching dataset 214 based on the samplex and perform one or more modifications based on the matching dataset (or equivalently, based on a samplex of the matching dataset). For example, the module 222 may enrich the structured dataset 126 by adding at least one typed attribute 130 based on attribute frequent itemsets information 404. The module 222 may enrich the structured dataset by adding at least one row from the matching dataset, and/or by adding at least one cell value of the matching dataset to a row of the structured dataset. The module 222 may cleanse at least one cell value of the structured dataset.

Some embodiments include a structured dataset modification preview module 224 residing in the memory. In some embodiments, the preview module 224 can make visible to a user 104 the results of any modification that is possible through the modification module 222. In other embodiments, only some (not all) of the possible modifications can be previewed. Regardless, the preview module 224 has instructions which upon execution by the processor will automatically provide the user with a preview of a modification to the matching dataset.

In some embodiments, the system 102 includes instructions residing in the local memory which upon execution by the local processor will perform operations to provide certain interface capabilities. The instructions may be part of the modification module 222, the preview module 224, or other client 406 code, such as interface 322 code. One interface capability 324 displays through color markup a high degree of confidence in a suggested correction of the structured dataset, e.g., by showing cleansed cells with a green background, green borders, or green fonts in a cleansing preview to display confidence in the cleansing, and with yellow to display doubt. One interface capability 324 provides a modification preview feature controlled by hovering a cursor over the structured dataset, so that preview results are shown when the cursor is over the dataset or dataset portion) that would be modified, and not shown otherwise. One interface capability 324 provides a context menu which controls bulk modification of multiple cells of the structured dataset, e.g., modification that adds or cleanses multiple cells subject to a single suggestion acceptance. Some embodiments exercise 320 an interface capability to display gravitated datasets without necessarily implicating modification of the user's original dataset, e.g., by displaying for view 372 at least a portion of a matching dataset without requiring or offering or performing modification of the structured dataset based on the matching dataset.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, service filters 218 and services 220 may be on multiple devices/systems 102 in a networked cloud, candidate datasets 212 may be stored on yet other devices within the cloud, and the interface 322, modification module 222, and/or preview module 224 may configure the display 134 on yet other cloud device(s)/system(s) 102.

Processes

FIG. 3 illustrates some process embodiments in a flowchart 300. Processes shown in the Figures may be performed in some embodiments automatically, e.g., by a modification module 222 driven by requests to a tool 120 that is running under control of a script or otherwise requires little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a dataset obtaining step 302, an embodiment obtains a structured dataset 126. Step 302 may be accomplished using notification, messages, invocations, polling, and/or other mechanisms which tell a proactive module 222 or 224 that a tool 120 has opened a dataset file, for example.

During a casting step 304, an embodiment casts a dataset into a samplex 210, that is, the embodiment computationally forms (creates or updates) a samplex 210 from selected information of the dataset. As discussed above, different embodiments may select different characteristics of the dataset for inclusion in the samplex. The samplex 210 may be implemented as a struct, a record, XML code, an object, or using other familiar data structures adapted to contain characteristics as described herein. Additional values, such as timestamps, digital signatures, checksums, and metadata may also be included in a samplex.

During an identifying step 306, an embodiment identifies one or more matching datasets 214 based on a samplex 210. Step 306 may be accomplished by comparing samplexes of candidate datasets element-by-element with the samplex of an original dataset of interest. Identity of each element is not necessarily required. A tolerance may be specified, for a given element (e.g., within ten years of each other) and/or for the samplex as a whole (e.g., at least five elements must match for samplexes to match, or at least 80% of elements must match for samplexes to match).

During a modification performing step 308, an embodiment computationally performs a modification of a structured dataset and/or of the dataset's work context. For example, step 308 may include enriching 310 the dataset with more rows, columns, and/or cells, may include changing 312 cell value(s) 314, and/or may include adding 316 a shared-entity 318 dataset to the context 128. Step 308 may be accomplished by operating existing data entry code of a tool 120 while feeding it the new and/or different data of the matching dataset or service for the modification, instead of allowing it to feed on user-supplied data.

During an interface capability exercising step 320, an embodiment exercises an interface capability 324. For example, step 320 may include displaying 326 a suggested modification 330, displaying 328 a preview 332 of a suggested modification, or reverting 334 to undo a modification previously performed 308. Reverting 334 may use an internal history of operations, similar to the undo functionality of word processors, spreadsheets, and other tools but operating with the modifications 330 discussed herein.

During a security requirement conforming step 336, an embodiment conforms with a security perimeter condition 338. For example, the embodiment may bring a candidate dataset inside a perimeter 402 instead of allowing a dataset of interest to be brought outside the perimeter. Familiar security mechanisms such as permissions, filesystem access controls, certificates, authentication, firewalls, and the like may be used to specifically provide security of datasets 126.

During scenario using steps 340, 342, an embodiment uses a from-example scenario 344 or a from-scratch scenario 346, respectively. Some embodiments support both scenarios, while others support only one of the scenarios.

During a modification suggesting step 348, an embodiment suggests one or more modifications 330 of a dataset of interest 126 and/or of its context 128. Some embodiments proactively suggest specific modifications such as specific row additions, while other embodiments merely alert the user that modifications are available, by a dialog or by displaying a list or other summary of available modifications, for instance.

During a service matching step 350, an embodiment matches (or attempts to match) a dataset—via the dataset's samplex—with a dataset service 220. Services 220 may have their own samplexes, which define for example the attributes the service expects to find in a dataset 126 it operates on. It is expected that service samplexes, unlike dataset samplexes, will often be generated manually by service providers rather than being generated automatically.

During a dataset supplying step 352, a user (or an embodiment operating on behalf of a user) supplies a structured dataset of interest, a.k.a., an original dataset. Step 352 may be accomplished by opening a dataset file in a tool 120 or by beginning creation of a dataset schema in a tool 120, for example.

During a dataset modifying step 354, a user (or an embodiment operating on behalf of a user) modifies a structured dataset of interest, a.k.a., an original dataset. Step 354 may be accomplished by operating an embodiment through a script or by user interface gestures in order to cause the embodiment to perform 308 a modification 330.

During a perimeter selecting step 356, a user (or an embodiment operating on behalf of a user) selects a security perimeter 402 to contain user-supplied datasets 126, e.g., by using familiar security mechanisms noted in connection with step 336.

During a perimeter selection confirming step 358, a user (or an embodiment operating on behalf of a user) confirms a previous selection 356 of a perimeter 402, e.g., either explicitly by interface gesture or implicitly by using an embodiment in which the selection 356 was made.

During a service selecting step 360, a user (or an embodiment operating on behalf of a user) selects a dataset service 220, e.g., by using interface gestures (mouse click, key press, screen touch, icon drag, etc.).

During a service selection confirming step 362, a user (or an embodiment operating on behalf of a user) confirms a previous selection 360 of a dataset service 220, e.g., either explicitly by interface gesture or implicitly by using an embodiment in which the selection 360 was made.

During a computational system operating step 364, a user (or software operating on behalf of a user) operates a computational system 102, e.g., by a script or by using interface gestures (mouse click, key press, screen touch, icon drag, etc.).

During a dataset file opening step 366, a user (or an embodiment operating on behalf of a user) opens one or more files which contain at least a portion of a dataset 126, e.g., by opening a dataset file in a tool 120.

During a suggestion receiving step 368, a user receives a modification suggestion 330 from an embodiment, e.g., as part of a preview or in a list of proactively offered modifications 330. During a suggestion accepting step 370, a user accepts a modification suggestion 330 from an embodiment, either explicitly by interface gesture or implicitly by not reverting the modification.

Suggestions 330 and modifications 330 are designated herein with the same reference numeral 330, in recognition that suggestions will sometimes be adopted and thus be modifications, and with the understanding that any suitable distinction between a suggested modification and an accepted modification will be clear in context to one of skill in the art. Use of the shared reference number does not mean that every suggestion must be accepted, or that any modification must first be presented as a suggestion (in a preview or otherwise).

During a cell value viewing step 372, a user views a cell value 214, e.g., in a spreadsheet shown on a display.

During a suggestion viewing step 374, a user views an image showing results of a suggested modification, e.g., in a spreadsheet shown on a display.

The foregoing steps and their interrelationships are discussed in greater detail below, in connection with various embodiments.

From an embodiment's perspective, some embodiments provide users with a process for managing structured datasets. The process includes the computational step of obtaining 302 in a user work context a structured dataset which has at least one typed attribute. In some embodiments, each typed attribute has a column name and an associated data type, but other labels may also be used, e.g., in N-dimensional datasets. The process also includes computationally casting 304 the structured dataset into a samplex, which has at least one typed attribute in common with the structured dataset. Some embodiments include identifying 306 at least one matching dataset 214 and/or matching 350 dataset service 220 based at least partially on the samplex.

Some embodiments include performing 308 one or more modifications 330 based at least partially on the matching dataset or service. For example, some enrich 310 the structured dataset by adding at least one typed attribute of the matching dataset based at least partially on attribute frequent itemsets information. Some enrich 310 the structured dataset by adding at least one row of the matching dataset. Some enrich 310 the structured dataset by adding at least one cell value of the matching dataset or service to a row of the structured dataset. Some change 312 at least one cell value of the structured dataset to match a cell value from the matching dataset or service. Some add 316 the matching dataset to the user work context, with the matching dataset sharing an entity 318 with the structured dataset and not necessarily sharing a typed attribute with the structured dataset. Some embodiments match 350 a samplex (and hence a dataset) to a particular service 220, such as a data cleansing service.

Some embodiments exercise 320 an interface capability 324 by computationally performing certain steps. For example, some display a cell value of the structured dataset in a first color and at the same time display 326 a suggested modification of another cell value in a second different color (e.g., a different background, border, and/or font color). Some display a color indication that a modification suggestion exists, without necessarily displaying the suggestion itself unless prompted or configured to do so. Some change 312 a cell value from a first value to a second value, display the second value, and then revert 334 to the first value without having the user type in the first value after the second value has been displayed. Some display 328 a modification preview, namely, an image of a result of a possible modification that has not yet been accepted by a user.

In some embodiments, the casting step casts 304 the structured dataset into a samplex which has at least one of the following in common with the structured dataset, in addition to having at least one typed attribute in common with the structured dataset: an attribute category, a cell value, any other characteristic of samplexes 210 discussed herein.

In some embodiments, the step of identifying 306 at least one matching dataset or dataset service (based at least partially on the samplex) conforms with at least one specified perimeter condition 338. Thus, in some embodiments a matching dataset identification occurs computationally inside a client perimeter, with the matching dataset being a dataset which was brought inside the client perimeter. In some, a matching dataset identification occurs computationally inside a client perimeter, with the matching dataset having a dataset samplex which was brought inside the client perimeter. In some, a matching dataset identification occurs computationally outside a client perimeter, by using the structured dataset samplex outside the client perimeter without bringing the structured dataset itself outside the client perimeter.

Some embodiments use 340 a from-example scenario 344. In this kind of scenario, the structured dataset 126 includes at least one row with corresponding typed attributes and with one or more cell values populating the row(s). Some of these embodiments include computational steps within the user work context such as proactively suggesting 348 an additional attribute for the structured dataset, an additional row for the structured dataset, a change in at least one of the cell value(s), an additional cell value, or a cell value deletion.

Some embodiments use 342 a from-scratch scenario 346. In this kind of scenario, the structured dataset includes at least one typed attribute but does not necessarily include any cell values yet, because a user is creating a schema from scratch. Some of these embodiments computationally suggest within the user work context additional attributes for the structured dataset. The suggestion 330 may be based at least partially on the attribute(s) the user has entered, and may be based on attribute frequent itemsets information.

From a user's perspective, some embodiments are done by a user to manage structured datasets in a user work context. For example, in some cases the user's process includes supplying 352 to a computational system in the user work context an original structured dataset 126, e.g., by opening the structured dataset in a spreadsheet application 120 within the computational system. The dataset 126 may include at least one typed attribute, and may include at least one row with corresponding typed attributes and with one or more cell values populating the row(s). The user also modifies 354 the original structured dataset or the user work context (or both) by operating 364 the computational system to perform modifications 330. Modifications may be based at least partially on a matching dataset or dataset service, which was not first explicitly identified to the computational system in the user work context (that is, the system identifies the match, not the user).

In some cases, the user process enriches 310 the structured dataset by adding at least one typed attribute of the matching dataset. In some, the user process enriches 310 the structured dataset by adding at least one row from the matching dataset. In some, the user process enriches 310 the structured dataset by adding at least one cell value from the matching dataset to a row of the structured dataset. In some, the user process changes 312 at least one cell value of the structured dataset to match a cell value of the matching dataset. In some, the user process adds 316 the matching dataset to the user work context. A matching dataset may share an entity 318 with the structured dataset without sharing a typed attribute with the structured dataset.

In some embodiments, the user receives 368 a structured dataset modification suggestion 330 from the computational system between the supplying step 352 and the modifying step 354, and then accepts 370 the suggestion. As a result of this timing and activity, the modifying step 354 includes operating the computational system to implement (i.e., carry out within the dataset) the suggestion.

In some cases, a user is employed by an "enterprise", namely, a corporation, agency, institution, or other entity having at least 50 employees. In such circumstances, enriching 310 the structured dataset may involve adding at least one typed attribute based on attribute frequent itemsets information of the enterprise. That is, some attributes will be statistically more frequently used together within the enterprise than other attributes, and those statistics—frequent itemsets information—can be used to frame suggestions 330.

In some embodiments, the user process includes viewing 372, 374 an interface capability 324. For example, a user may view 372 a cell value 314 of the structured dataset in a first color and at the same time view 374 a suggested modification of another cell value in a second different color. In some cases, a user may change 312 a cell value from a first value to a second value, view the second value, and then revert 334 to the first value without typing in the first value after the second value has been viewed (conventional data entry is not considered reversion). In some, a user may view 374 a modification preview, namely, an image of a result of a modification suggestion that has not yet been accepted by the user.

In some cases, the user process includes selecting 356 a client perimeter to limit distribution of the structured dataset, and/or confirming 358 a prior human or automated selection of a client perimeter to limit distribution of the structured dataset. In some, the user process includes selecting 360 a data cleansing, data enriching, or other service 220, e.g., to suggest changes to cell values of the structured dataset. In some it includes confirming 362 a prior human or automated selection of a service 220. In some cases, the user process includes selecting 360 a shared-entity-datasets service to suggest datasets which share an entity with the structured dataset; in some it includes confirming 362 a prior human or automated selection of a shared-entity-datasets service to suggest datasets which share an entity with the structured dataset.

FIG. 4 is a data flow diagram illustrating aspects of structured dataset management in an example architecture. A given embodiment does not necessarily encompass every item shown in FIG. 4 (or in any other Figure) but the overall architecture is described to aid understanding of the possible embodiments and their operation and components.

A given client 406 may be a client in the server-client sense, or a node in a peer network, or it may have some other role from a networking perspective. Regardless, a client 406 is considered a client for purposes of structured dataset management because it is what a user interacts with most directly.

The illustrated client 406 includes logic such as a samplex engine 408, a candidates match-up 410, and a try-it-on user experience 412. The samplex engine 408 may include a samplex module 208 for generating samplexes 210, and a library, repository, or other collection of samplexes (particularly those cast from candidate datasets 212), for example. The candidates match-up 410 may include service filters 218, code for comparing samplexes with one another, and match-indications 216, for example. The try-it-on user experience 412 may include an interface 322 with code for displaying interface capabilities 324, a preview module 224, and a modification module 222, for example. These functionalities may be organized differently in different embodiments, and not every embodiment has every functionality.

Within the illustrated architecture, various data services 414 may exist. A data cortex service 416 provides an interface (via web services, APIs, etc.) between clients 406 and a data cortex 418. The data cortex service 416 may also include authentication, logging, billing, and similar administrative functionality. The data cortex 418 may include heuristics 420 for matching samplexes with providers of services 220, e.g., a mechanism for distinguishing between a "bat" attribute that concerns baseball and a "bat" attribute that concerns flying mammals, and suggesting services 220 accordingly.

In some approaches, the data cortex 418 may include compound indexes 422. This may occur when candidate datasets indexed in the cortex can have more than one "dimension" (attribute) that characterized them, and/or when users original datasets are multidimensionally cast 304 into samplexes. Compound indexes may provide attribute frequent itemsets information.

In some approaches, the data cortex 418 may include an auction framework 424, in which candidate dataset collections are offered for licensing, dataset services are offered, or both. Other market metaphors may also be implemented in a structured dataset management architecture. Pluggable, parallel modules may be evolved by user interaction scores to provide relevant datasets and services 220. In some embodiments, the data cortex 418 is a context generating service, whose input is the user's original data and whose output is the user's data in a context containing additional relevant data.

In the illustrated architecture, system services 426 include compound index management, data provider administration, and shared-entity maps. Compound index management provides a repository for compound indexes and attribute frequent itemsets information. Data provider administration includes a registry of dataset collection providers, dataset service providers, and related data such as contact information. Shared-entity maps provide connections between datasets and/or dataset services based on shared entities, including entities which are often of interest to users.

In the illustrated architecture, data sources 428 accessible (possibly on a transaction fee or subscription basis) to clients include private structured data 430 such as datasets already owned or licensed within a user's enterprise. Also available may be curated data 432 such as datasets offered by commercial data providers (often within a specific topic and/or with specific quality guarantees), and extracted data 434 from the open public web or the deep web, which does not necessarily have any quality guarantee.

In the illustrated architecture, knowledge services 436 accessible (possibly for a fee) to clients include dataset services 220, and meta-services that provide information about dataset services 220, such as topics, costs, recency, provider identity, and so on. Knowledge services 436 may also include X-line heuristics 438 such as time-line or place-line heuristics. Entities 318 that have histories have time-lines. Entities 318 that have geographic distribution have place-lines. Entities 318 that have internal organizational structures have org-lines, and so on. Once an entity 318 is identified as being of interest, heuristics can indicate what kind of X-lines are relevant to it and offer datasets accordingly to users. For example, if an entity 318 is a public company, clients may be offered revenue-lines for companies in a set that includes the public company.

More generally, a structured dataset management architecture may include any combination of features described herein, or equivalent aspects. As a few additional specific examples, an embodiment may use color markup schemes to represent types of suggested information (generic suggestion, high confidence correction, missing value, alternative value, etc.). An embodiment may maintain the ability to revert any value at any time, with original values stored in the background. Bulk operations over many cells may be supported by a context menu to accept/implement suggestions and/or revert. In some embodiments, a "try it on" preview feature allows a user to hover over datasets and get immediate previews of what additional rows/columns as well as cleansing suggestions would look like before accepting them. Some embodiments automatically and proactively populate schema suggestions as a user is typing column headers. Although datasets are prominent as examples herein, some embodiments also match between a samplex and services 220.

As a design target, for some embodiments, a user need not search for relevant data, because relevant data will find its users. That is, relevant data will effectively gravitate to a user's work context, without the user directly searching or browsing the web to find it. A user's original data appears to pull other the relevant data and relevant services to the user, so "try-it-on" is the default interaction mode between clients and users.

In some embodiments, with regard to schema extension, an embodiment casts a samplex into a schema-context-synonym standard form and then suggests the most popular extensions. As to data extension, some embodiments cast a samplex into a schema-context-synonym standard form, create a list of similar sets, and use samples/samplexes to find a best match. As for shared entities, in some embodiments, a samplex is used to identify an EntityType, which leads to X-line match-ups: timeline, placeline, partline, and so on. Of course, these specifics are not required in every embodiment.

In some embodiments, a samplex is not required. Some match the exact attribute name values on external sets to the user's local dataset, and then return those matched sets as suggested external data to the spreadsheet user to "try on".

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as samplexes 210, a samplex module 208, a service filter 218, a proactive dataset modification module 222, and/or a modification preview module 224, in the form of data 118 and instructions 116, read from a removable medium 114 and/or another source such as a network connection, to form a configured medium. The configured medium 112 is capable of causing a computer system to perform process steps for transforming datasets through proactive suggestions as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. For example, not every embodiment requires a samplex. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for managing structured datasets, the process comprising the computational steps of:

obtaining in a user work context a structured dataset of interest which has at least one typed attribute, each typed attribute comprising a column name and an associated data type;

casting the structured dataset into a samplex having at least one typed attribute in common with the structured dataset, the samplex also defined by at least the following characteristics: the samplex is a computational derivation of the structured dataset, the samplex does not compromise confidentiality of values in cells of the structured dataset, the samplex includes a computational adjustment which reflects at least one local condition, historic productivity being a local condition, enterprise policy also being a local condition;

identifying at least one matching dataset or dataset service based at least partially on the samplex; and performing at least one of the following modifications based at least partially on the matching dataset:
  (a) enriching the structured dataset by adding at least one typed attribute of the matching dataset based at least partially on attribute frequent itemsets information;
  (b) enriching the structured dataset by adding at least one row of the matching dataset;
  (c) enriching the structured dataset by adding at least one cell value of the matching dataset to a row of the structured dataset;
  (d) changing at least one cell value of the structured dataset to match a cell value of the matching dataset or dataset service; or
  (e) adding the matching dataset to the user work context, wherein the matching dataset shares an entity with the structured dataset and does not share a typed attribute with the structured dataset.

2. The configured storage medium of claim 1, wherein the process further comprises exercising an interface capability by computationally performing at least one of the following steps:

displaying a cell value of the structured dataset in a first color and at the same time displaying a suggested modification of another cell value in a second different color;

changing a cell value from a first value to a second value, displaying the second value, and then reverting to the first value without typing in the first value after the second value has been displayed; or displaying a modification preview, namely, an image of a result of a possible modification that has not yet been accepted by a user.

3. The configured storage medium of claim 1, wherein the casting step casts the structured dataset into a samplex which has at least one of the following in addition to having at least one typed attribute in common with the structured dataset: an attribute category, a cell value.

4. The configured storage medium of claim 1, wherein the step of identifying at least one matching dataset based at least partially on the samplex conforms with at least one of the following conditions:

a matching dataset identification occurs computationally inside a client perimeter, with the matching dataset being a dataset which was brought inside the client perimeter;

a matching dataset identification occurs computationally inside a client perimeter, with the matching dataset having a dataset samplex which was brought inside the client perimeter;

a matching dataset identification occurs computationally outside a client perimeter, by using the structured dataset samplex outside the client perimeter without bringing the structured dataset itself outside the client perimeter;

a matching dataset identification occurs computationally inside a client perimeter, using a service filter inside the client perimeter which communicates with a service located outside the client perimeter.

5. The configured storage medium of claim 1, wherein the process occurs within a from-example scenario, in the sense that the structured dataset includes at least one row with corresponding typed attributes and with one or more cell values populating the row(s), and wherein the process comprises at least one of the following computational steps within the user work context:

proactively suggesting an additional attribute for the structured dataset;
proactively suggesting an additional row for the structured dataset;
proactively suggesting a change in at least one of the cell value(s);
proactively suggesting an additional cell value; or
proactively suggesting a cell value deletion.

6. The configured storage medium of claim 1, wherein the process occurs within a from-scratch scenario, in the sense that the structured dataset includes at least one typed attribute and a user is creating a schema from scratch, and wherein the process comprises computationally suggesting within the user work context additional attributes for the structured dataset based at least partially on the attribute(s) the user has entered and on attribute frequent itemsets information.

7. The configured storage medium of claim 1, wherein the process further comprises matching a samplex to a data cleansing service.

8. A process for a user to use a computational system for managing structured datasets in a user work context, the process comprising the steps of:

supplying to the computational system in the user work context an original structured dataset which includes at least one row with corresponding typed attributes and with one or more cell values populating the row(s);
casting the structured dataset into a samplex having at least one typed attribute in common with the structured dataset, the samplex also defined by at least the following characteristics: the samplex is a computational derivation of the structured dataset, the samplex does not compromise confidentiality of values in cells of the structured dataset, the samplex includes a computational adjustment which reflects at least one local condition, historic productivity being a local condition, enterprise policy also being a local condition; and
modifying the original structured dataset or the user work context by operating the computational system to perform at least one of the following modifications based at least partially on a matching dataset without first explicitly identifying the matching dataset to the computational system in the user work context:
(a) enriching the structured dataset by adding at least one typed attribute of the matching dataset;
(b) enriching the structured dataset by adding at least one row from the matching dataset;
(c) enriching the structured dataset by adding at least one cell value from the matching dataset to a row of the structured dataset;
(d) changing at least one cell value of the structured dataset to match a cell value of the matching dataset; or
(e) adding the matching dataset to the user work context, wherein the matching dataset shares an entity with the structured dataset and does not share a typed attribute with the structured dataset.

9. The structured dataset management process of claim 8, wherein the modifying step comprises operating the computational system to perform at least one of the enriching modifications.

10. The structured dataset management process of claim 8, wherein the supplying step comprises opening the structured dataset in a spreadsheet application within the computational system.

11. The structured dataset management process of claim 8, wherein the process further comprises the user:
receiving a structured dataset modification suggestion from the computational system between the supplying step and the modifying step;
accepting the suggestion; and
wherein the modifying step comprises operating the computational system to implement the suggestion.

12. The structured dataset management process of claim 8, wherein the user is employed by an enterprise and the process comprises enriching the structured dataset by adding at least one typed attribute based on attribute frequent itemsets information of the enterprise.

13. The structured dataset management process of claim 8, wherein the process further comprises viewing an interface capability by performing at least one of the following steps:
viewing a cell value of the structured dataset in a first color and at the same time viewing a suggested modification of another cell value in a second different color;
viewing a color indication that a modification suggestion exists;
changing a cell value from a first value to a second value, viewing the second value, and then reverting to the first value without typing in the first value after the second value has been viewed; or
viewing a modification preview, namely, viewing an image of a result of a modification suggestion that has not yet been accepted by the user.

14. The structured dataset management process of claim 8, wherein the process further comprises at least one of the following:
selecting a client perimeter to limit distribution of the structured dataset;
confirming a prior human or automated selection of a client perimeter to limit distribution of the structured dataset;
selecting a data cleansing service to suggest changes to cell values of the structured dataset;
confirming a prior human or automated selection of a data cleansing service to suggest changes to cell values of the structured dataset;
selecting a data enriching service to suggest enrichments of the structured dataset;
confirming a prior human or automated selection of a data enriching service to suggest enrichments of the structured dataset;
selecting a shared-entity-datasets service to suggest datasets which share an entity with the structured dataset; or
confirming a prior human or automated selection of a shared-entity-datasets service to suggest datasets which share an entity with the structured dataset.

15. A computational system for managing structured datasets, the system comprising:
a local logical processor;
a local memory in operable communication with the local logical processor;
a structured dataset residing in the local memory and having at least one typed attribute, each typed attribute comprising a column name and an associated data type;
a structured dataset samplex module residing in the local memory and having instructions which upon execution by the local logical processor will automatically cast the structured dataset into a samplex having at least one typed attribute in common with the structured dataset;

the samplex of the structured dataset, residing in the local memory, the samplex having at least the following characteristics: the samplex is a computational derivation of the structured dataset, the samplex does not compromise confidentiality of values in cells of the structured dataset, the samplex includes a computational adjustment which reflects at least one local condition, historic productivity being a local condition, enterprise policy also being a local condition; and an indication residing in the local memory and indicating whether a candidate dataset, which does not necessarily reside in the local memory, is a matching dataset of the structured dataset, based on the samplex.

16. The system of claim 15, wherein the local memory is located entirely within a secure client perimeter, and where at least one of the following also resides in memory, although not necessarily local memory, that is also within the secure client perimeter: the candidate dataset, a samplex of the candidate dataset.

17. The system of claim 15, further comprising a service filter which contains instructions that upon execution by a processor will proactively identify a service which is compatible with the samplex and which will provide at least one of the following: data cleansing, data de-duplication, dataset matching, dataset value extension, dataset schema extension.

18. The system of claim 15, further comprising a structured dataset modification module residing in the memory and having instructions which upon execution by the processor will automatically and proactively locate a matching dataset based on the samplex and perform at least one of the following modifications based on the matching dataset:

(a) enriching the structured dataset by adding at least one typed attribute based on attribute frequent itemsets information;
(b) enriching the structured dataset by adding at least one row from the matching dataset;
(c) enriching the structured dataset by adding at least one cell value of the matching dataset to a row of the structured dataset; or
(d) cleansing at least one cell value of the structured dataset.

19. The system of claim 15, further comprising a structured dataset modification preview module residing in the memory and having instructions which upon execution by the processor will automatically provide a preview of a modification to the matching dataset.

20. The system of claim 15, wherein the system comprises instructions residing in the local memory which upon execution by the local processor will perform at least one of the following:

display through color markup a high degree of confidence in a suggested correction of the structured dataset;
display at least a portion of a matching dataset without requiring modification of the structured dataset based on the matching dataset;
display at least a portion of a matching dataset without offering modification of the structured dataset based on the matching dataset;
display at least a portion of a matching dataset without performing modification of the structured dataset based on the matching dataset;
provide a modification preview feature controlled by hovering a cursor over the structured dataset; or
provide a context menu which controls bulk modification of multiple cells of the structured dataset.

\* \* \* \* \*